G. H. CRAMER.
SEAT HANGER FOR CAROUSELS.
APPLICATION FILED OCT. 23, 1916.
1,217,280.
Patented Feb. 27, 1917.
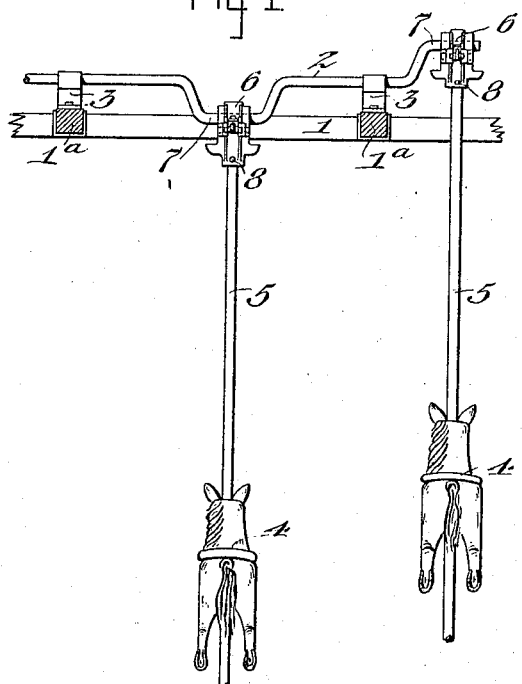
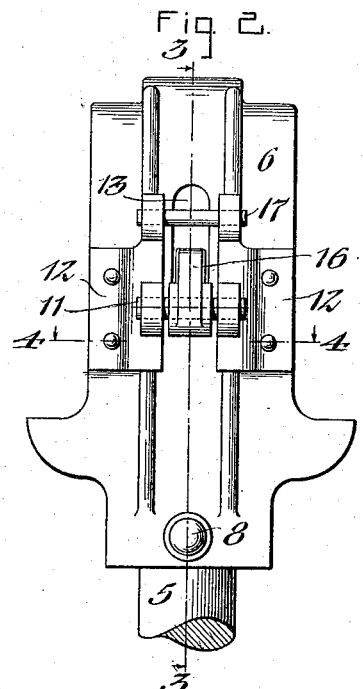
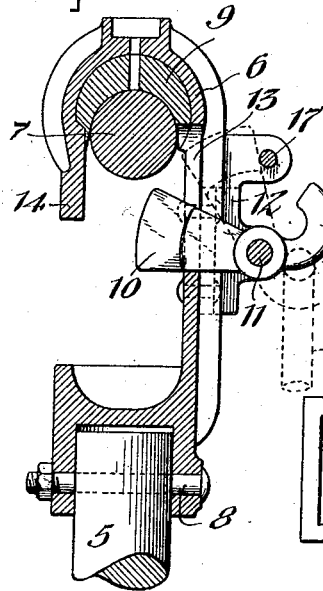
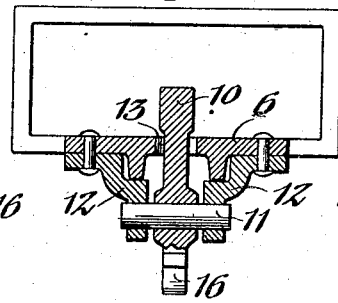
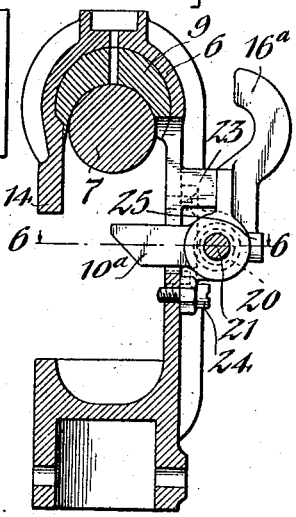
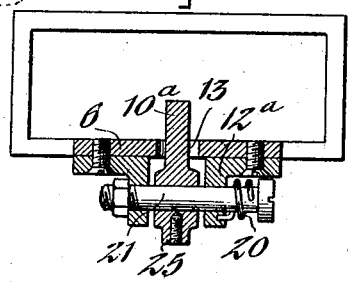
INVENTOR
George H. Cramer,
by Geyer & Popp
ATTORNEYS.

UNITED STATES PATENT OFFICE.

GEORGE H. CRAMER, OF NORTH TONAWANDA, NEW YORK, ASSIGNOR TO HERSCHELL-SPILLMAN COMPANY, OF NORTH TONAWANDA, NEW YORK, A CORPORATION OF NEW YORK.

SEAT-HANGER FOR CAROUSELS.

1,217,280.  Specification of Letters Patent.  Patented Feb. 27, 1917.

Application filed October 23, 1916. Serial No. 127,052.

*To all whom it may concern:*

Be it known that I, GEORGE H. CRAMER, a citizen of the United States, residing at North Tonawanda, in the county of Niagara and State of New York, have invented new and useful Improvements in Seat-Hangers for Carousels, of which the following is a specification.

This invention relates to the hangers or connections by which the vertically-reciprocating seats of carousels are suspended from the usual crank shafts mounted on the sweep-frame or rotary superstructure of the machine.

As ordinarily constructed, these hangers are in the form of hooks which are removably retained upon the cranks of the shafts by bolts passing through the hangers below the shafts. Aside from the time required to apply and remove these bolts, this construction has the disadvantage of requiring the attendant to climb up to the crank shafts in order to reach the bolts. Owing to the inconvenience of this task, the hangers are sometimes left in an unsafe condition by failure to apply the bolts, incurring the danger of injury to passengers and by-standers by the accidental detachment and dropping of the suspension rods. This construction is, moreover, unsatisfactory in carousels which are transported from place to place at frequent intervals, such, for example, as follow county fairs and carnivals.

The object of my invention is to provide such seat-hangers with a simple safety catch which reliably retains them upon the crank shafts, in order to effectually guard against injury to passengers and which permits the ready application of the hangers to the shafts and their ready detachment therefrom without the necessity of climbing upon the sweep-frame, thus insuring the proper use of the retaining device and enabling the machine to be quickly assembled or dismembered.

In the accompanying drawings: Figure 1 is a fragmentary sectional elevation of the sweep-frame of a carousel and the suspension devices of a number of the figures of animals or other seats carried by it and embodying the invention. Fig. 2 is a side elevation, on an enlarged scale, of one of the hangers. Fig. 3 is a vertical section on line 3—3, Fig. 2. Fig. 4 is a horizontal section on line 4—4, Fig. 2. Fig. 5 is a vertical section similar to Fig. 3, showing a modified form of the invention. Fig. 6 is a horizontal section on line 6—6, Fig. 5.

Similar characters of reference indicate corresponding parts throughout the several views.

1 indicates one of the sweeps or radial members of the rotary sweep-frame, and 1ª a pair of the transverse bars which connect adjacent sweeps. 2 indicates one of the customary radial crank shafts supported in the usual bearings 3 carried by the bars 1ª, and 4 indicates two of the seats which are carried by the usual vertically reciprocating suspension rods 5 having the hook-shaped hangers 6 which embrace the cranks 7 of said shaft. The lower ends of the hangers are secured to the upper ends of the suspension rods 5 by bolts 8 or other suitable means, while the hooks of the hangers are provided with the customary liners 9 of Babbitt or other appropriate material.

Referring to the embodiment of the invention illustrated in Figs. 1–4, 10 indicates an automatic safety catch movably mounted on the body or shank of the hanger and normally arranged below the corresponding crank of the shaft in the proper position to prevent detachment of the hanger from the shaft. This catch preferably consists of a vertically-swinging pawl pivoted upon a horizontal pin 11 supported in brackets 12 projecting from the outer side of the hanger shank. The pawl extends inwardly through a vertical slot or opening 13 formed in said shank and projects a sufficient distance toward the bill 14 of the hook-shaped hanger to prevent the crank of the shaft from escaping between the pawl and the bill in the normal locking position of the pawl shown in Figs. 3 and 4. The downward movement of the pawl is limited by the lower end of the slot 13. The pawl is preferably enlarged or weighted at its free end, as shown, so that it tends to drop into its locking position by gravity, as shown by full lines in Fig. 3. The hub of the pawl is provided on its outer or rear side with a releasing tail or hook 16 by which the pawl may be swung up into the dotted position, shown in Fig. 3 in which it clears the crank shaft and permits the hanger to be lifted therefrom. The upward movement of the pawl is limited by a transverse pin 17 mounted on the brackets 12 above the pivot pin 11 of the pawl.

Normally the pawl 10 occupies its lower position, and in connecting the suspension rod 5 to the crank shaft it is only necessary to pass its hanger over the shaft, the latter tripping the pawl aside until the hanger rests upon the shaft, when the pawl drops by gravity to the position shown by full lines in Fig. 3 and locks the hanger upon the shaft. This operation can be conveniently performed from the floor or platform of the carousel, doing away with the necessity of climbing upon the sweep-frame for this purpose.

To detach one of the suspension rods from the crank shaft, the corresponding safety pawl is simply swung to the vertical position shown by dotted lines in Fig. 3, by means of a suitable pull rod 18 which is engaged with the hook 16 of the pawl and which is of sufficient length to reach it from the platform of the machine. In this raised position of the pawl, the hanger of the suspension rod can be freely lifted off the crank shaft.

In the modified construction of the improvement shown in Figs. 5 and 6, the safety pawl $10^a$ is arranged substantially like that of the first described construction and provided with a releasing hook $16^a$, but instead of depending upon gravity for holding the pawl in its locking position, it is provided with a suitable spring 20 for this purpose. The spring shown in the drawings is coiled around the bolt or pivot pin 21 of the pawl and fastened at one end to it and at its other end to the adjacent bracket $12^a$. When the pawl is tripped to its upper or unlocking position in engaging the hanger with the crank shaft, the spring is strained and as soon as the pawl clears the shaft, the spring returns it to its locking position, as shown in Figs. 5 and 6. In this case the downward movement of the pawl may be limited by a stop lug 23 arranged to be encountered by the releasing hook $16^a$, while its upward movement may be limited by a stop-screw 24 on the hanger, arranged to be engaged by a boss 25 of the pawl.

I claim as my invention:

1. A seat-support for a carousel, comprising a suspension-rod provided with a hook-shaped hanger adapted to engage a shaft, the hanger-body being provided with a vertical slot arranged opposite the bill of the hanger, and a vertically-swinging safety-pawl pivoted to the hanger-body and extending through said slot, said pawl being provided on the outer side of the hanger with a releasing member.

2. A seat support for a carousel, comprising a suspension-rod provided with a hook-shaped hanger adapted to engage a shaft, the hanger being provided opposite its bill with a vertical slot, a horizontal pivot-pin supported on the outer side of the hanger opposite said slot, and a vertically-swinging safety-pawl mounted on said pin and extending through said slot, the pawl being provided on the outer side of said pivot pin with a releasing hook.

3. A seat-support for a carousel, comprising a suspension-rod provided with a hook-shaped hanger adapted to engage a shaft, the hanger being provided in its shank opposite its bill with a vertical slot, brackets projecting from the outer side of the hanger on opposite sides of said slot, a horizontal pivot-pin carried by said brackets, a safety-pawl mounted on said pin and extending through said slot, and a stop-pin for the pawl arranged on said brackets above said pivot-pin.

GEORGE H. CRAMER.

Copies of this patent may be obtained for five cents each, by addressing the "Commissioner of Patents, Washington, D. C."